(12) United States Patent
Batten et al.

(10) Patent No.: US 7,153,439 B1
(45) Date of Patent: Dec. 26, 2006

(54) GREASE SEPARATOR FOR KITCHEN SINKS AND OTHER APPLICATIONS

(75) Inventors: William C. Batten, Asheboro, NC (US); Bruce Kyles, Asheboro, NC (US); Charles Kemp, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 113 days.

(21) Appl. No.: 10/985,710

(22) Filed: Nov. 10, 2004

Related U.S. Application Data (62) Division of application No. 10/655,519, filed on Sep. 4, 2003, now Pat. No. 6,849,176.

(51) Int. Cl.
*B01D 21/02* (2006.01)
*C02F 1/40* (2006.01)

(52) U.S. Cl. .................. 210/800; 210/532.1; 210/921

(58) Field of Classification Search ............... 210/800, 210/801, 803, 805, 86, 248, 256, 257.1, 258, 210/320, 521, 532.1, 533, 540
See application file for complete search history.

(56) References Cited

U.S. PATENT DOCUMENTS

| 1,159,044 A | 11/1915 | Kelly Jr. |
| 1,164,527 A | 12/1915 | Kelly Jr. |
| 1,200,951 A | 10/1916 | Kelly Jr. |
| 3,872,017 A | 3/1975 | Bishop ................. 210/525 |
| 4,400,274 A | 8/1983 | Protos ................. 210/302 |
| 5,225,085 A | 7/1993 | Napier et al. .......... 210/705 |
| 5,360,555 A | 11/1994 | Batten ................. 210/803 |
| 5,951,878 A | 9/1999 | Astrom ................ 210/791 |
| 5,993,646 A | 11/1999 | Powers ................. 210/86 |
| 6,056,128 A | 5/2000 | Glasgow ............... 210/521 |
| 6,059,963 A | 5/2000 | Horakova et al. ...... 210/143 |
| 6,079,571 A | 6/2000 | Stowell ............... 210/510 |
| 6,491,830 B1 | 12/2002 | Batten et al. .......... 210/803 |
| 6,849,176 B1 * | 2/2005 | Batten et al. ........... 210/97 |
| 2001/0025811 A1 * | 10/2001 | Batten ................. 210/143 |
| 2002/0170864 A1 * | 11/2002 | Batten et al. .......... 210/803 |

FOREIGN PATENT DOCUMENTS

| CH | 678438 A5 | 9/1991 |
| EP | 555672 A1 | 8/1993 |
| GB | 2216821 A | 10/1989 |

* cited by examiner

*Primary Examiner*—Robert James Popovics
(74) *Attorney, Agent, or Firm*—MacCord Mason PLLC (57) ABSTRACT

An oil/grease separator separates a lighter liquid from a mixture of the heavier liquid and a lighter liquid. A housing has an inner volume, an inlet to receive influent flow, an outlet to discharge the heavier liquid, which defines a static liquid level, and an outlet port above the static liquid level to discharge substantially all of the lighter liquid and portions of the heavier liquid. The lighter liquid floats on the heavier liquid, so that large volume flows into the inlet raises the liquid level in the housing, flowing the floating lighter liquid through the outlet port.

12 Claims, 11 Drawing Sheets

GREASE SEPARATOR FOR KITCHEN SINKS AND OTHER APPLICATIONS

This application is a division of application Ser. No. 10/655,519 filed Sep. 4, 2003, and now U.S. Pat. No. 6,849,176.

BACKGROUND OF THE INVENTION

The invention concerns an apparatus for separation of oil/grease and solid waste material from an effluent flow from a sink, permitting the passage of grey water to a sewage line.

Over the past thirty years there has been a move towards requiring food handling facilities to have sufficient systems for servicing kitchen grease and solid waste bearing water flows. One of the largest problems, in terms of sewer system lines clogging, has been the oils and grease put into the sewer system from food handling facilities. These problems and the increase of the severity of the situation in the recent past has led more and more sewer authorities to implement fats, oils, grease and solid waste control programs. The object of many of these programs is to ensure that food handling facilities remove as much as possible of the oil/grease and solid waste from the effluent flow, thereby releasing only grey water and solids into the sewage system.

Oil/grease and solid waste containment removal for recovery systems are well known in the prior art. One method recognized in the prior art accomplishing such removal is an apparatus containing one or more rotating disks formed of a plastic or like material to which oil and grease contaminants are attracted. Typically, the rotation of the disk in at least partially immersed condition allows the oil to cling the disk, so that the oil and grease is removed from the body of the water upon rotation of the disk. A scraper is typically used to force the oil and grease contaminants from the opposite sides of the disk and channel such contaminants into a storage collection unit.

The above-mentioned types of devices are assembled within rigid containers and the rotating disks are in fixed positions. The scraper assemblies are also in fixed rigid positions. This makes servicing of the apparatus difficult, particularly since the parts to be serviced have been covered in grease and oil. In addition, the units may have been permanently installed in a plumbing system so field service is required. Because of the nature of installation, the field service is difficult.

Accordingly, there is a need in the art for a new apparatus for separation of oil and grease from wastewater that is simple in design and that needs little service. The apparatus should have easily replaceable parts for easy field servicing. In addition, there is a need in the art for a low cost apparatus that does not require significant capital outlay.

SUMMARY OF THE INVENTION

The present invention fulfills one or more of these needs in the art by providing an oil/grease and solid waste removal apparatus which is low in cost, easy to maintain and easy to install. The apparatus isolates lighter liquid from a mixture of the heavier liquid and a lighter liquid with which the lighter liquid is immiscible. A housing has an inner volume with an inlet into the volume to receive an influent flow of a mixture of the heavier liquid and the lighter liquid. A first outlet from the volume to discharge the heavier liquid is positioned such that the first outlet defines a static liquid level in the housing and a second outlet is positioned in the housing so substantially all of the lighter liquid held in the volume can flow through the second outlet, which may be above the static liquid level in the housing. As surges of influent flow are received in the housing and temporarily raise the liquid level above the static liquid level, lighter liquid on top of the heavier liquid in the volume is discharged through the second outlet, together with portions of the heavier liquid. A storage vessel receives the liquids from the second outlet. The second outlet may act as a return path from a low portion of the storage vessel to the housing to return heavier liquid from the storage vessel to the housing. The lighter liquid in the housing tends to float on the heavier liquid in the housing, so that transient large volume flows into the inlet of the housing have minimal tendencies to disturb the lighter liquid and therefore do not cause a substantial discharge of the lighter liquid with the heavier liquid through the first outlet.

The apparatus may include a sink having a drain connected to the inlet at the bottom of the sink housing. The inlet discharges downwardly into the housing.

In a preferred embodiment, an outer tank serves as the storage vessel. An inner tank has the inlet, which discharges downwardly into the inner tank. The inner tank is preferably made of roto-molded plastic and has multiple chambers with varying heights from the inlet to the first outlet. The multiple chambers of the inner tank promote a rise and fall of liquid within the inner tank caused by large volume flows when the connected sink is emptied. This flow of fluids aids the oil and grease to rise to the top of a liquid column within a chamber of the inner tank.

The inner tank preferably includes a solid waste removal chamber that receives the effluent flow containing solid waste from the connected sink through the inlet. The solid waste removal chamber has an internal baffle between the inlet and the outlets and the internal baffle includes a screen to prevent the downstream movement of solids. The internal baffle with the screen traps solid waste material from the effluent flow within the solid waste chamber. The solid waste chamber is connected to a solid waste transporter, which may be an eductor. The eductor creates suction upstream of the internal baffle and screen and is connected to the first outlet. The first outlet is typically connected to the sewage system, so suction created by the eductor transports the solid waste material through the outlet into the sewage system.

The inner tank further includes an oil separation chamber and an effluent separation chamber. The oil separation chamber has a height that is higher than the static fluid level in the tank and has the second, oil discharge outlet. Preferably, the oil separation chamber has a high point for the inner tank, so the lighter liquid (oil/grease) migrates to that high point near the oil/discharge outlet. The effluent separation chamber is connected to the first outlet and includes a dam or weir. When liquid levels are below its height, the dam acts as a dam, and as levels rise, it acts as a weir. The dam has a weep slot or hole. The bottom of the slot or hole defines the static liquid level in the inner tank.

The storage vessel receives the oil from the inner tank and in a preferred embodiment is comprised of the space between the inner tank and the outer tank. The outer tank may be constructed of roto-molded plastic and has a port through which the first outlet extends to remove grey water to the sewage system. The outer tank includes a valve which may be manually operated or connected by way of a pump.

This valve or pump enables the flow of separated oil from the oil storage vessel. In another embodiment the oil storage vessel includes a sensor which indicates the oil and water level within the oil storage vessel and signals when the oil within the storage vessel reaches a level which requires oil drainage. The outer tank typically includes a cover constructed of roto-molded plastic. The outer tank may contain a heater which may either be manually or electrically activated and keeps the separated oil and grease in a flowable state.

The oil/grease separator receives effluent flow when the attached sink is emptied. The oil separation chamber receives the mixture of heavier and lighter liquid. The solid waste may be periodically removed by the eductor within the solid waste removal chamber. The heavier liquid is typically water and the lighter liquid is typically oil and grease. The oil and grease rises to the top of the fluid mixture by gravity within the oil separation chamber with each sink drainage cycle. The oil and grease flows out of the inner tank through the oil discharge outlet of the oil separation chamber, into the storage vessel as the fluid mixture rises during the sink drainage cycle. The oil and grease mixture flowing out of the oil discharge outlet may contain significant amounts of water.

The transfer could actually be 100% water. Essentially, the same quantity of fluid moves both ways. If one pint of water/grease/oil transfers to the storage vessel, then one pint of water will return to the inner tank. If there is no grease in the inner tank this transfer of one pint will still take place. But, since any grease/oil in the outer tank rises to the top of that tank, only water is transferred back from the bottom of the outer tank.

The surges of influent flow caused by the drainage cycle of the sink create a range of fluid flow velocities. This range of fluid flow velocities includes a low flow rate and a high flow rate. The effluent separation chamber receives water flow from the oil/grease separation chamber during a sink drainage cycle, typically from a low passage, so that the oil/grease that has risen does not accompany this flow. The high flow rate caused by the sink drainage cycle causes the water level to rise in the effluent separation chamber until it flows over the dam and through the first outlet into the sewage system. As the water level subsides, it drains to the first outlet through the weep slot or hole. During low flow rates, the removal of water by the weep slot permits flow without significantly raising the liquid level in the oil separation chamber. As the flow decreases until the effluent no longer passes over the weir, water escapes from the weep slot/hole. The water level in the inner tank decreases until it reaches the bottom of the weep slot/hole. The liquid level in the oil storage tank also decreases, until it reaches the higher of the bottom of the weep slot/hole or the bottom of the second outlet. The relative heights of those two bottoms can be varied within the scope of the invention.

Another embodiment of the apparatus may include an exterior oil/grease storage tank which is connected to the oil and grease outlet. This exterior oil/grease storage tank has a discharge valve and a grease sensor. The grease sensor signals when the oil/grease storage tank requires service. The oil/grease storage tank further includes a return flow path connected to the housing. The flow path is located at the bottom of the oil/grease storage tank and includes a check valve that prevents flow from the housing to the oil/grease tank through the return flow path, but permits the flow of water back into the housing. Essentially, the same quantity of fluid moves both ways. If one pint of water/grease/oil transfers to the storage vessel, then one pint of water will return along the return flow path. If there is no grease in the oil separation chamber, this transfer of one pint will still take place. But, since any grease/oil in the storage tank rises to the top of that tank, only water is transferred back from the bottom of the storage tank.

Retained oil and grease in the oil separation chamber is forced through the oil and grease outlet into the oil and grease storage tank by high water flows caused by the sink drainage.

The oil/grease separator may include a weir located in the oil/grease extraction chamber. The weir is tubular and may be plastic with an outwardly flanged tip at the top of the weir. The height of the weir is set to extend slightly above the water level at maximum expected flow. The weir communicates with the oil and grease outlet within the housing.

The oil/grease separator may include an oil pump which is located in the oil and grease extraction chamber and pumps oil and grease from the top of the fluid column into the oil and grease storage tank.

The oil/grease separator may include a central control module comprising a grease pump controller, an eductor controller, a grease pump solenoid, an eductor solenoid and three sensors. The central control module actuates functions based on signals received from the sensors. The grease pump controller engages or disengages the grease pump solenoid based on signals received from the sensors. The eductor controller engages or disengages the eductor by activating the eductor solenoid based on signals received from the sensors.

The oil/grease separator may include a protective cover constructed of stainless steel sheets which are welded or bolted together.

These and other aspects of the present invention will become apparent to those skilled in the art after reading the following description of the preferred embodiments when considered with the drawings.

BRIEF DESCRIPTION OF THE DRAWINGS

The invention will be better understood by a reading of the Detailed Description of the Preferred Embodiments along with a review of the drawings, in which.

DETAILED DESCRIPTION OF THE PREFERRED EMBODIMENT

In the following description, like reference characters designate like or corresponding parts throughout the several figures. It should be understood that the illustrations are for the purpose of describing preferred embodiments of the invention and are not intended to limit the invention thereto.

Figure 1:
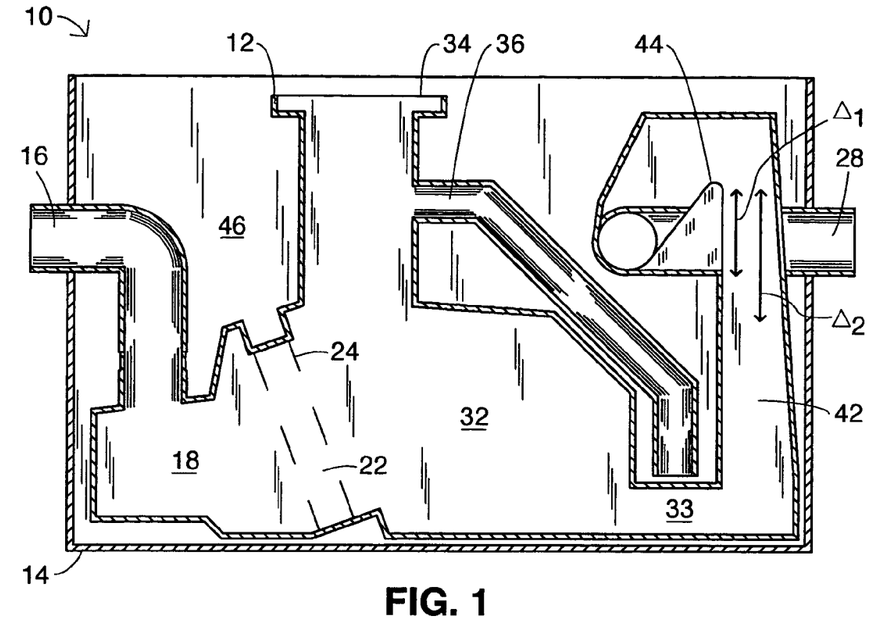
FIG. 1 is a schematic sectional drawing of an embodiment of the invention.
Figure 2:
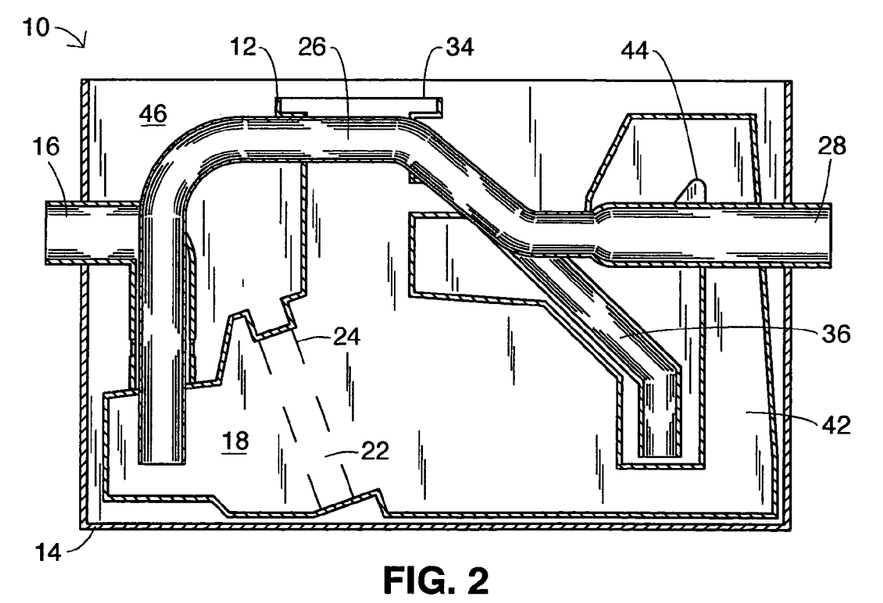
FIG. 2 is a schematic sectional drawing of an embodiment of the invention including the solid waste removal eductor.
Figure 3:
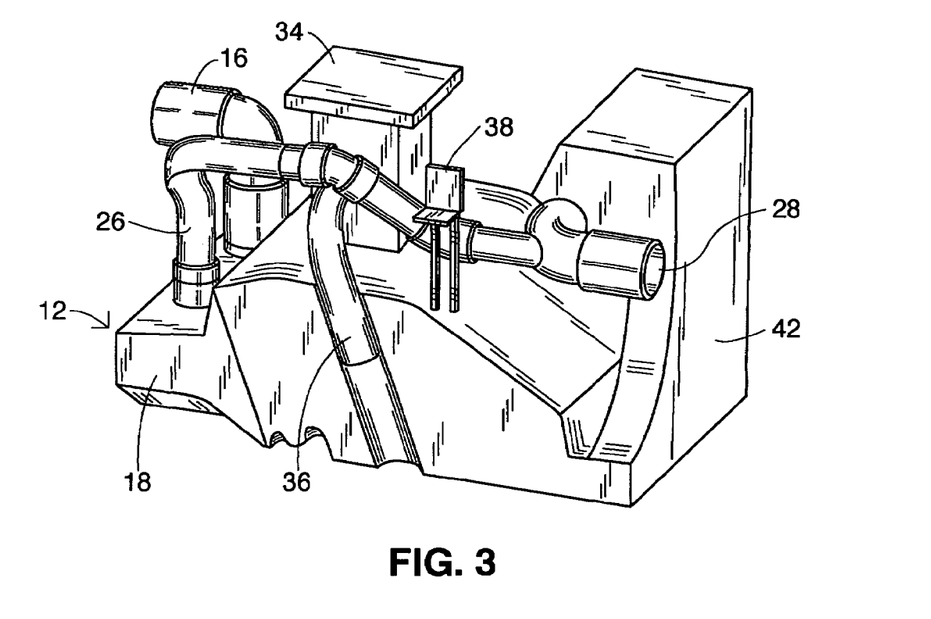
FIG. 3 is a front perspective view of the inner tank.

As best seen in FIGS. 1 through 3, an embodiment of the oil/grease separator 10 includes an inner tank 12, an outer tank 14, an inlet 16 and an outlet 28. The oil/grease separator 10 is typically connected to a sink (not shown). However, other sources of effluent such as machine tools or the like can also be serviced. Together, these sources are referred to herein as "sinks." The sink drain is connected to the inlet 16 and discharges downwardly into the inner tank 12. The inner tank 12 is preferably made of roto-molded plastic and comprises multiple chambers with varying heights from the inlet 16 to the outlet 28. The multiple chambers within the inner tank 12 promote a significant rise and fall flow of fluid level, which is caused by any input volume flow greater than the weep slot/hole escape volume flow. This fluid separation process of the invention is applicable to any input source that provides intermittent flows. The flow of fluid aids the oil and grease within the fluid mixture to rise to the top of the fluid column within the oil separation chamber 13 of inner tank 12. The oil/grease is lighter than water and rises to the top of the fluid column by the force of gravity.

The inner tank 12 includes a solid waste removal chamber 18. The solid waste removal chamber 18 has an internal baffle 22, which is positioned between the inlet 16 and the outlet 28. The internal baffle 22 typically includes a screen 24. The internal baffle 22 and the screen 24 trap solid waste material from the effluent flow within the solid waste removal chamber 18. During a flow of water from the sink (not shown) through inlet 16 caused by empting the sink, the solid waste material is trapped within the bottom chamber 18 by the internal baffle 24. The solid waste removal chamber 18 and the oil separation chamber 32 are separated by the baffle 24 and screen 22.

As seen in FIG. 2 a solid waste transporter 26 is connected to the solid waste removal chamber 18 and discharges downstream of the chamber 47. This solid waste transporter 26 may be an eductor as disclosed in U.S. Pat. No. 6,491,830 to Batten, et al. entitled "Kitchen Grease Removal System," the entire disclosure of which is incorporated herein by reference. It can also be a grinder pump as disclosed in U.S. Pat. No. 5,360,555 to Batten entitled "Solids Handling in an Oil/grease Separator," the entire disclosure of which is incorporated herein by reference. The eductor embodiment has a jet of water that creates a suction effect in the solid waste removal chamber 18 to transport solids to the outlet 28 and then to the sewage outlet as may be appropriated, the sewage outlet could be a septic tank.

Figure 2A:
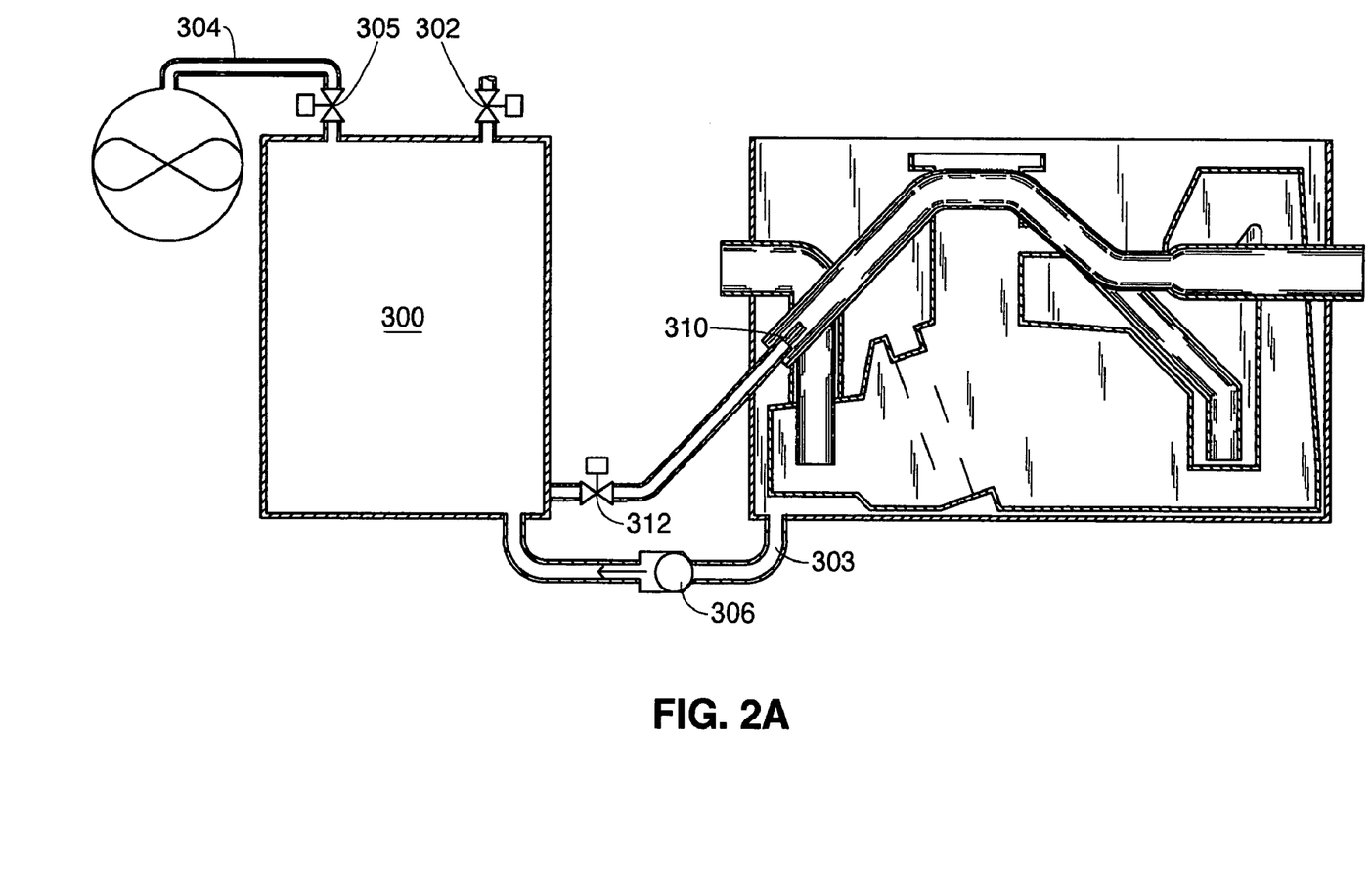
FIGS. 2A and 2B show alternate solid waste transporter embodiments.

In another possible variation seen in FIG. 2A, the eductor may be provided with a separate chamber 300 having a vent hole at its top, selectively opened or closed by a solenoid 302 or other valve. A compressed air source 304 opens to the top of the chamber. During periods of when the eductor is not in operation, the valve 302 is open, allowing water to flow into the chamber along a low drain line 303 past check valve 306. Since the connection is to the bottom of the outer chamber, the heavier liquid—water—is what flows to the chamber 300, not oil/grease. When eductor operation is needed, the valve 302 is closed and compressed air is admitted to the top of the chamber past valve 305. Once the pressure has reached a desired level, solenoid eductor valve 312 is opened, forcing the collected water back out through the jet 310 at high velocity, creating the desired eduction effect. When the eductor cycle is through, the valve 312 closes, the pressurized air is turned off and valve 302 re-opens to begin a new cycle. This is a particularly useful installation where potable water conservation is desirable. Alternatively, the water line with the check valve 302 could receive water from various points where grey water can be sourced.

Figure 2B:
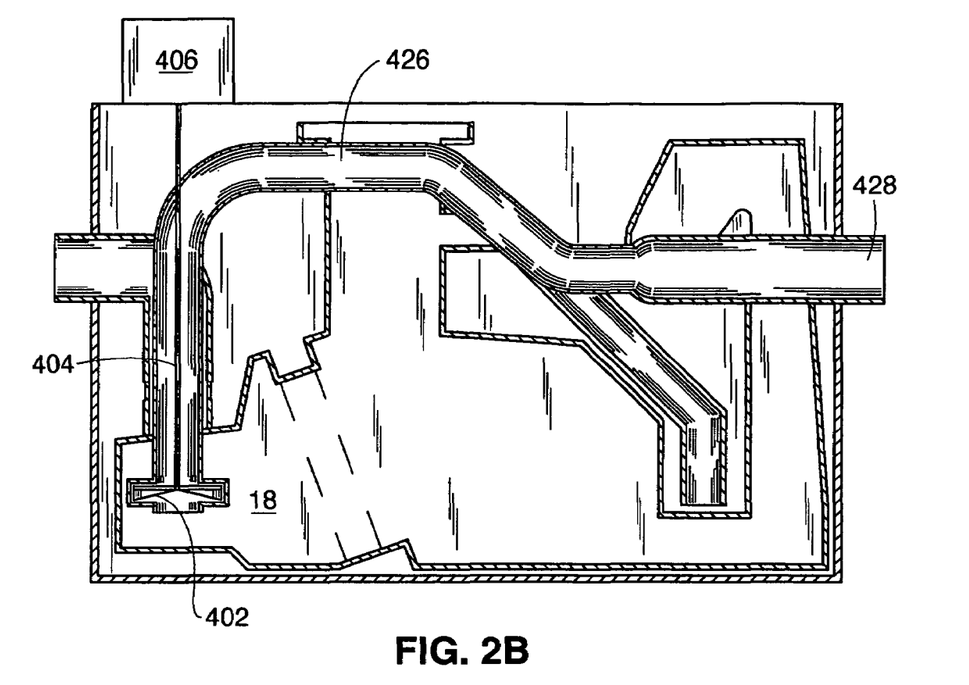

A further solid waste transporter option is seen in FIG. 2B. An impeller 402 is positioned in the solid waste removal chamber 18 and connected by a shaft 404 to cause the impeller to be driven by a macerator pump motor 406. The pump motor 406 is periodically actuated, such as by a timer, to macerate solids in the chamber 18 and impel them along with water through the discharge pipe 426 to the outlet 424 connected to the drain.

The inner tank 12 includes an oil separation chamber 13. The oil separation chamber 13 has a height that is higher than the static fluid level within the inner tank 12. This height typically is higher than most of the inner tank, to concentrate or focus the oil/grease in chamber 13. The static fluid level in the inner tank is defined by the bottom of a weep slot or hole 52 (see FIGS. 7 and 7A) in the outlet 28. The oil separation chamber 13 also has an oil discharge outlet 36 that removes oil and water from the inner tank 12 and transfers the oil into the oil storage vessel 46. The top of the chamber 13 is preferably vented, with a replaceable lid, so that it can be serviced, if needed, and so it remains at atmospheric pressure, along with the ullage of outer tank 14.

Figure 7:
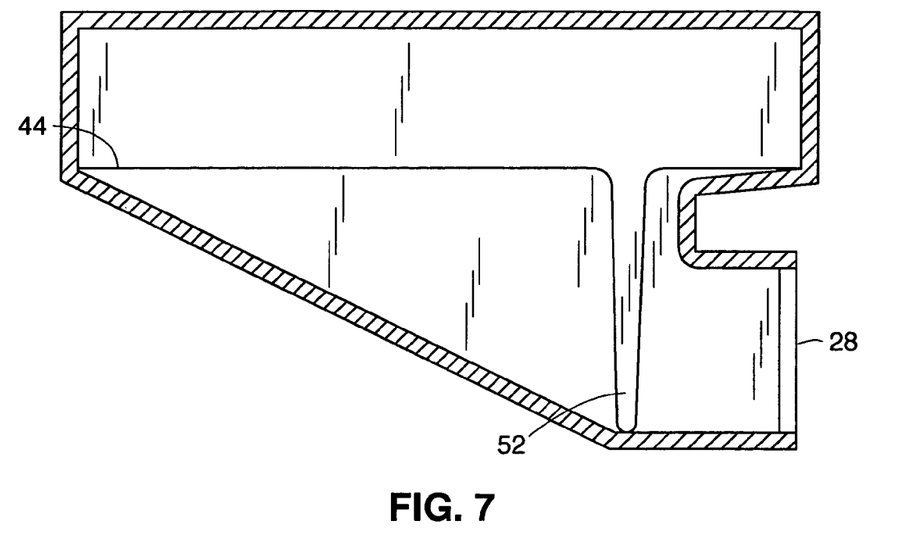
FIG. 7 is a sectional view of the dam and weep slot.
Figure 7A:
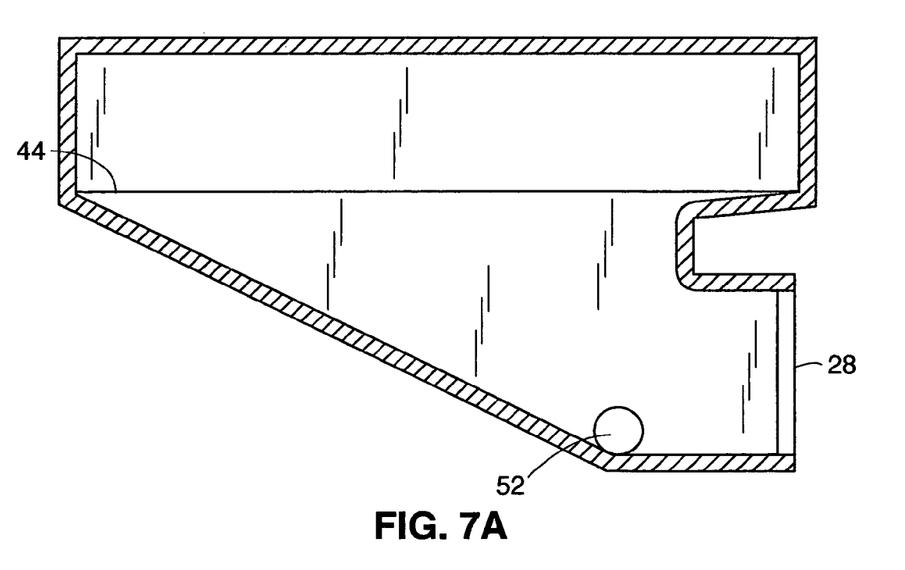
FIG. 7A is a sectional view of a dam and weephole.

The inner tank 12 further includes an effluent discharge chamber 42 connected to the chamber 13 through a lower passage 33, which minimizes the lighter liquid's ability to move to the chamber 42. The effluent discharge chamber 42 includes a dam 44 and a weep slot or hole 52, which is best seen in FIGS. 7 and 7A. The effluent discharge chamber 42 is connected to the outlet 28. High volume flows of grey water spill over the dam 44, through the outlet 28, into the sewage system (not shown). During periods of lower flow, the grey water level does not rise over the dam, but can flow out through the weep slot or hole 52.

Figure 4:
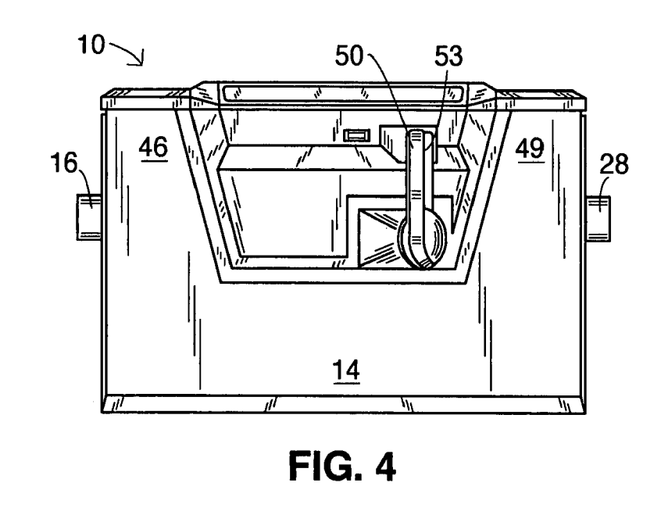
FIG. 4 is a front elevational view of the outer tank and FIG. 4A is a side elevational view of the outer tank.
Figure 4A:
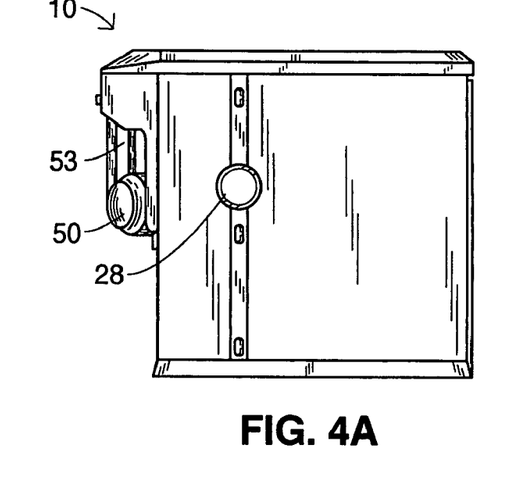
Figure 5:
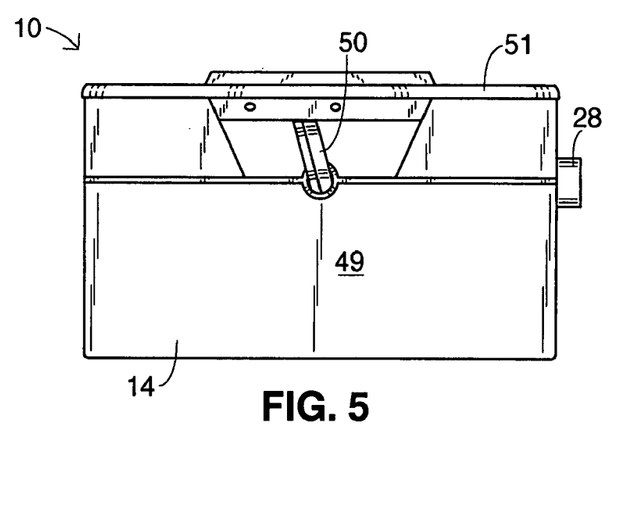
FIG. 5 is a front view of the outer tank with the outer cover.

Referring now to FIGS. 3, 4, 4A, and 5, the outer tank 14 is preferably constructed of roto-molded plastic. Other materials and methods can be used such as injection molding, metal stamping or other techniques. The space between the outer tank 14 and the inner tank 12 comprises the storage vessel 46. The storage vessel 46 receives the oil and some water from the inner tank 12. The outer tank 14 has inlet 16 and outlet 28 protruding through it but communicating only with the inner tan, not the outer tank. The outer tank 14 includes a valve 50, which is a manually operated. The valve 50 permits the drainage of the oil storage vessel 46 to an external container (not shown). As seen in FIGS. 4 and 4A, the valve 50 takes the form of an L-shaped tube with the longer portion of the L 53 outside the tank 46. The shorter leg extends into the tank 46 through seals in which the shorter leg can rotate. And, the shorter leg preferably extends into the tank at about a 45° angle to the primary front plane 49 of the tank. This angle causes the longer leg 53 to move away from the plane 49 as it is rotated down, to drain into the external container. When the leg 53 is turned down, the grease can flow out of the shorter leg through the longer leg 53 into the external container and continue until the longer leg is turned back up, or the oil/grease has drained down to the shorter leg's height on the plane 49.

Figure 6:
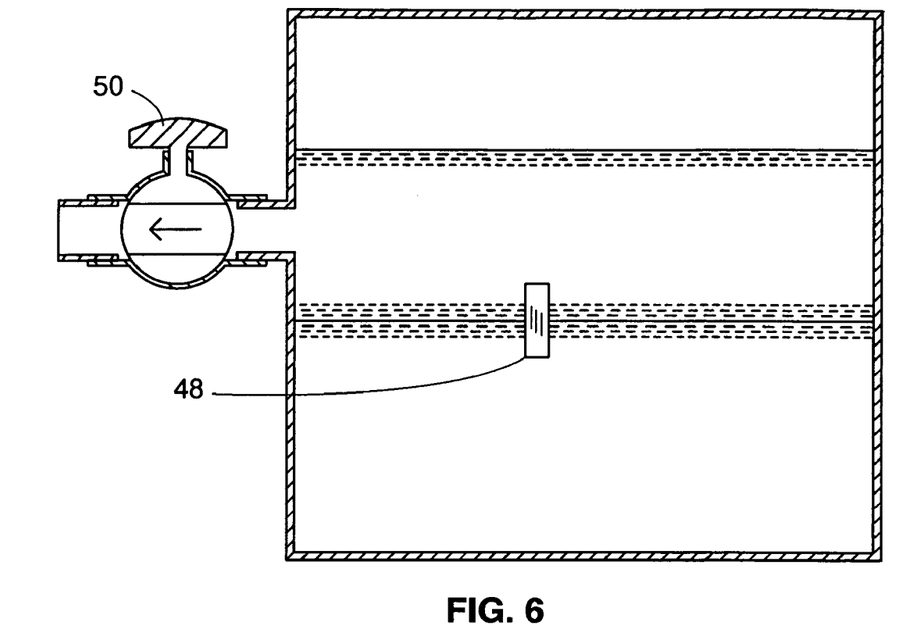
FIG. 6 is a schematic drawing of the oil release member with the oil level sensor.
Figure 6A:
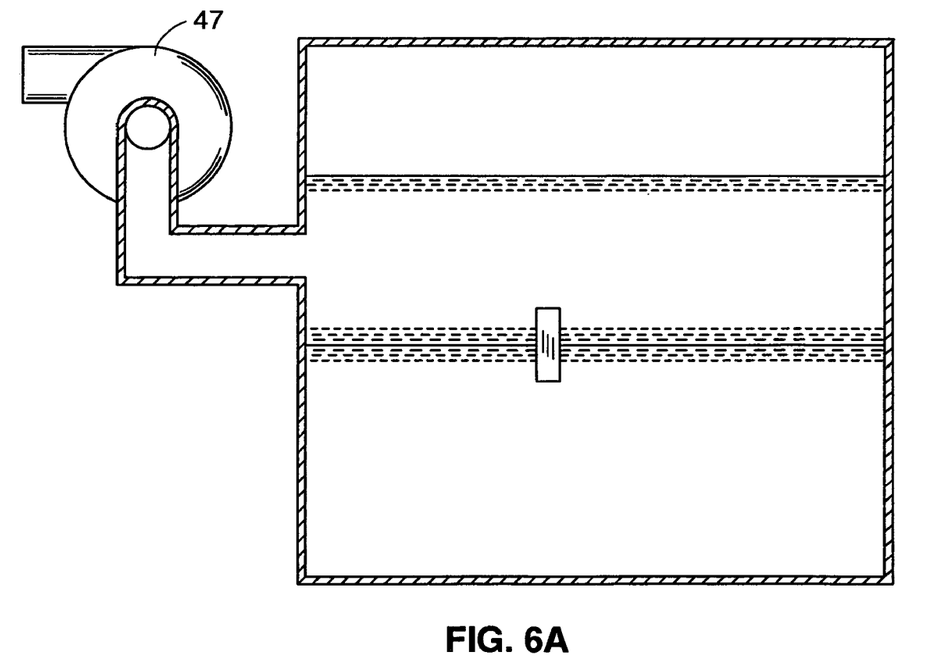

Referring now to FIG. 6, the outer tank 14 may include a sensor 48. The sensor 48 indicates the height of the oil and water within the storage vessel 46 and signals when the oil within the storage vessel 46 accumlates to the point that drainage through the valve 50 is needed. Alternatively as seen in FIG. 6A, the sensor 48 can activate a pump 47, or it can provide a signal for an operator to manually operate or activate a pump.

The outer tank 14 further includes a cover 51, which is preferably made of roto-molded plastic. The outer tank 14 further includes a heater 38 which may be manually or electrically activated. The heater 38 heats the separated oil and grease to maintain them in a flowable state.

In operation, the oil/grease separator 10 receives an effluent flow from the attached sink (not shown). The sink may have a low flow rate, depending on the nature of the use to which it is put. However, in a typical kitchen sink, especially for commercial kitchens, a sink full of water used to wash dishes is typically drained at one time, one or more times a day, causing a large flow of water and accompanying oil/grease and solids. The effluent flow contains solid waste material which is retained in the solid waste removal chamber 18 and removed to the sewage system (not shown) by the periodic actuation of the solid waste transporter 26. The fluid mixture comprising a heavier liquid and a lighter liquid flows into the oil separation chamber 13. Once the fluid mixture is in the oil separation chamber 13, the lighter liquid rises to the top of the fluid column by gravity. Furthermore, the combined height of the two fluids rises within the oil separation chamber 13 with each large volume flow, typically a sink's drainage cycle, as the inflow rate exceeds the rate of drainage through the weep hole/slot 52. The oil/grease, which is at the top of the fluid mixture, continues to rise until it flows out of the oil discharge outlet 36, into the oil storage vessel 46. The oil/grease mixture flowing into the oil storage vessel 46 from the oil discharge outlet 36 may contain significant amounts of water.

The effluent discharge chamber 42 receives grey water flow from the oil separation chamber 13 during low flows and during the sink drainage cycle. The high flow rate caused by the sink drainage cycle causes the water level to rise in the effluent separation chamber 42 until it flows over the dam 44 through the outlet 28 and into the sewage system (not shown). The system has been described in connection with intermittent high flow rates from sinks, such as kitchen sinks, but the invention also works well in other installations that generate intermittent large volume flows.

The weep slot 52, as best seen in FIG. 7 (or as a hole seen in FIG. 7A), discharges water from the effluent separation chamber 42 during high and low fluid flow rates. During relatively low flow rates, the weep slot or hole 52 permits low flow without significantly raising the water level in the oil separation chamber 42. The inner tank 12 is connected to the oil storage vessel 46 by the oil discharge outlet 36 in the oil separation chamber 13. As the flow rate declines at the end of each drainage cycle, the fluid level in the oil separation chamber 13 drops until it reaches the bottom of the weep slot or hole 52 in the effluent separation chamber 42. As the fluid level in the oil separation chamber 13 falls to the bottom of the weep slot or hole 52, the fluid level in the storage vessel 46 falls with it. Water in the vessel 46 flows from the bottom of the oil storage vessel 46 into the oil separation chamber 13 through the oil discharge outlet 36 until the fluid levels in the oil storage vessel 46 drops to the level equal to the bottom of discharge outlet 36. The fluid level in the inner tank 12 drops to a level just below the weep slot or hole 52, and this fluid level represents the static fluid level of the inner tank. The fluid levels within the inner tank remain substantially at the static level until the start of each large flow, such as a sink drainage cycle. In other embodiments (not shown) the outlet 36 may have a low point below the bottom of the weep hole/slot, in which case the static fluid level in the inner tank also prevails in the outer tank 14.

Since oil/grease floats on water, it is often the last component flowing from a sink in a sink drop, and a concentration of it from a prior sink drop is therefore often present in the inlet 16 between sink drops. As seen in FIG. 1, at the beginning of a sink drainage cycle, the water level in the chamber 42 rises above the dam or weir 44, with an attendant rise in the water level by the height $\Delta_1$ throughout the inner tank, before becoming free flowing over the weir and out the outlet 28. This rise throughout the inner tank inhibits an initial high volume flow through the passage 33, despite the fact that there is likely an inrush at inlet 16. That inrush causes the oil/grease concentration to flow out of the inlet 16 early in the next sink drop. But the slower flow through the passage 33 gives the concentration time to move into the oil separation chamber 32 and rise above the passage 33, so it does not flow through passage 33 once the water flows freely over the weir. Moreover, if the eductor has run since the last sink drop, the water level would have been pulled to a lower level in the chamber 18, to give an even larger volume with a vertical dimension of, for example, $\Delta_2$ to fill before generating a substantial current through passage 33. Using this approach, oil/grease removal efficiencies of 98–99% can be achieved.

Figure 8:
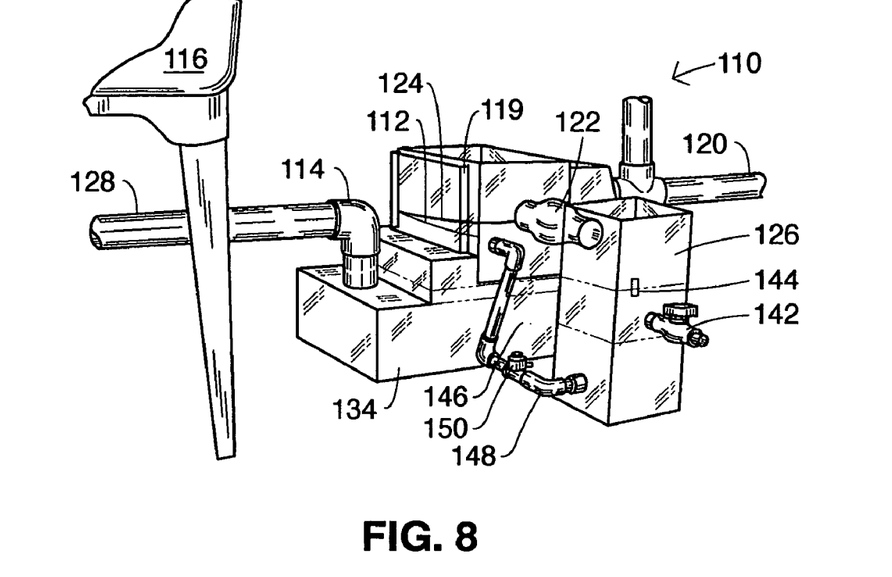
FIG. 8 is a front perspective view of an alternate embodiment.
Figure 9:
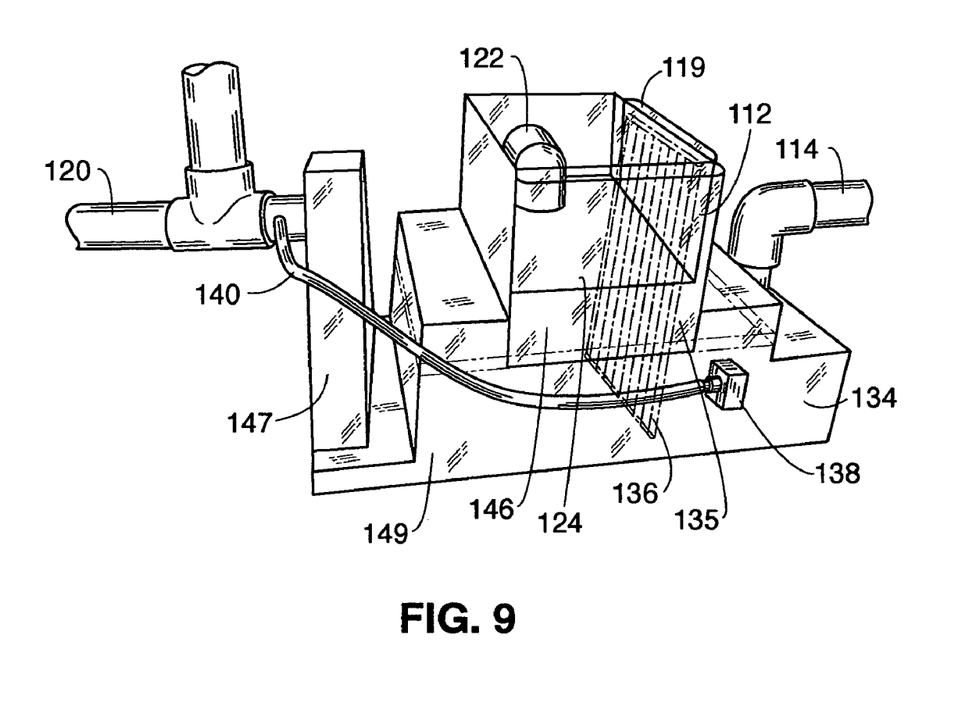
FIG. 9 is a rear prospective view of the embodiment of FIG. 8.

In an alternate embodiment as best seen in FIGS. 8 and 9, an oil and grease separator 110 includes a housing 112, a sink inlet 114, an oil and grease outlet 122, a ceiling 124 over the housing, a sewage outlet line 120, and an oil and grease storage tank 126. The bottom of the sewage outlet line 120 generally defines the static water level of the apparatus, since a water level higher than the bottom of the line drains through the outlet 120. The oil and grease separator 110 is connected to a sink 116 having a drain connected to the sink drainpipe 128. The sink drainpipe 128 discharges through the sink inlet 114 downwardly into the housing 112.

The housing 112 has multiple chambers, including bottom chamber 134, second chamber 146 and discharge chamber 147. The multiple level chambers promote a significant rise and fall of fluid level to aid the oil and grease to rise to the top of the column of water within the second chamber 146. This rise and fall of fluid level is promoted by large volume flows when the connected sink 116 is emptied. Once the flow is in the housing 112, the oil/grease in the chamber 146 rises to a stratum above the water under the influence of gravity. The sewage outlet 120 is connected to discharge chamber 147, which is connected through a lower passageway 149 to the second chamber 146.

A slot 119 opens upwardly between chamber 134 and chamber 146. The slot permits the downward installation of a screen to prevent the movement of solids from chamber 134 into chamber 146. As seen in FIG. 9, an eductor 138 has an inlet to the chamber 134 to permit the transport of solids from chamber 134 to the sewage line, as described above.

The oil and grease storage tank 126 includes an oil and grease discharge valve 142. The maximum height of the volume of liquid in the tank 126 is determined on a static basis by the height of the outlet 120 or the top of line 128, whichever is higher. Over time, the quantity of oil/grease in the tank 126 increases, pushing the boundary between oil/grease above and water below, downward. A return flow path 148 connects the bottom of the oil and grease storage tank 126 to the second chamber 146. This return flow path 148 also includes a check valve 150 that prevents water flow to the oil and grease storage tank 126 from the housing 112 through the return flow path 148. A grease sensor 144 is attached to the oil and grease storage tank 126 to indicate when the oil and grease in the tank 126 drops to the level of the sensor. The sensor 144 indicates that the oil and grease storage tank 126 is at capacity for the storage of oil/grease and requires emptying to prevent return of oil/grease through return line 148.

The second chamber 146 receives effluent water containing oil and grease from the bottom chamber 134 and the oil/grease collects under the ceiling 124. The ceiling 124 preferably slopes so that a high portion of it is adjacent the outlet 122, which is connected to the oil and grease storage tank 126 and has a check valve to prevent return flow from the tank 126. Because it is lighter, the oil and grease rises to the top of the second chamber 146 and resides under the ceiling 124. The volume of water received in the housing 112 when the sink 116 is emptied causes a momentary rise in the water level above the outlet pipe 120. This rise in water level causes the oil and grease to flow into the oil and grease storage tank 126 through the oil and grease outlet 122, causes the grey water to pass through the passageway 149 from the second chamber 146 through the chamber 147 and outlet 120 into the sewage system.

Water is likely to accompany oil/grease as it is transferred to the tank 126, but a secondary separation of this water takes place in the tank 126, with the separated water returning to the housing 112 through path 148.

Figure 10:
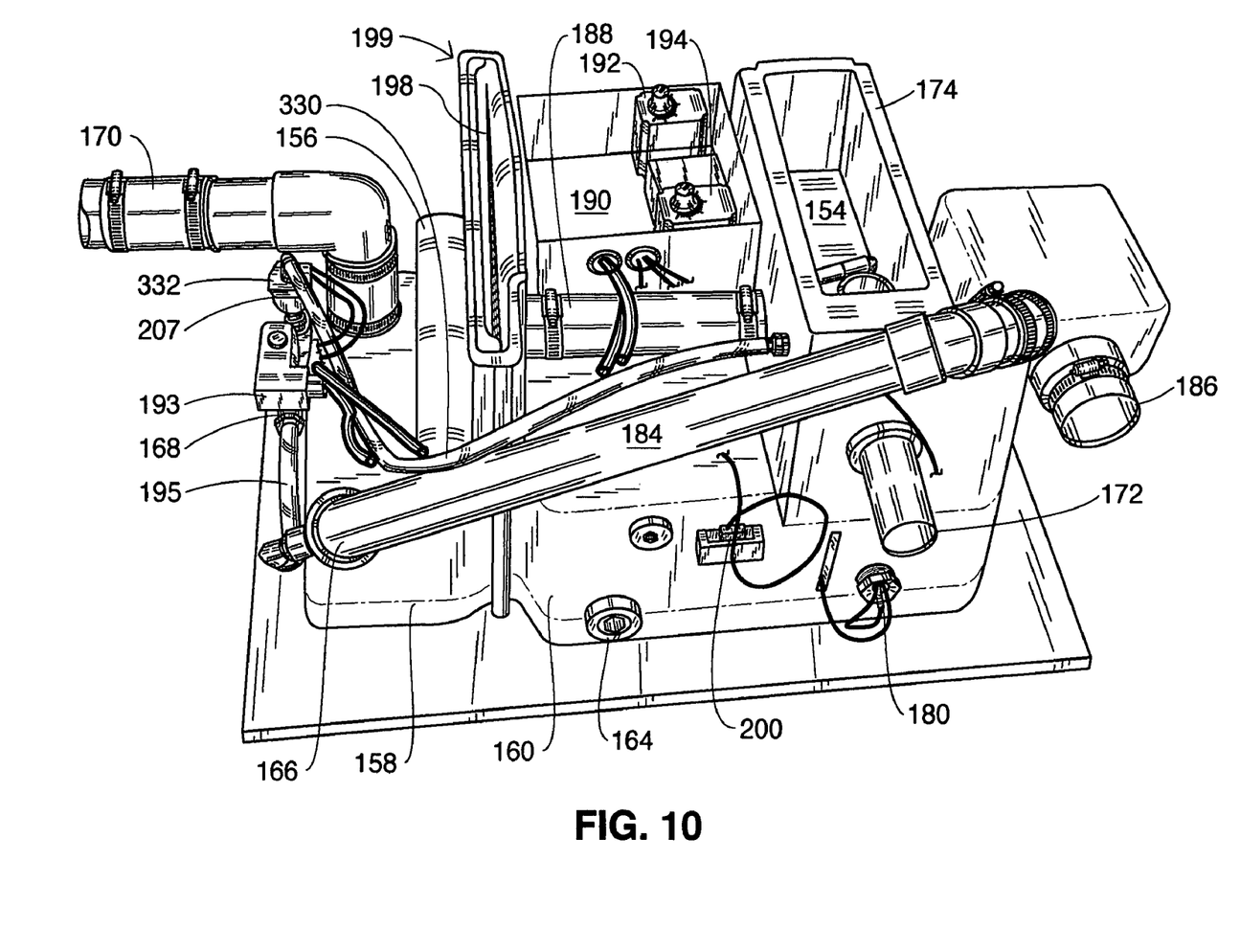
FIG. 10 is a top view of another alternate embodiment showing the central control module.
Figure 11:
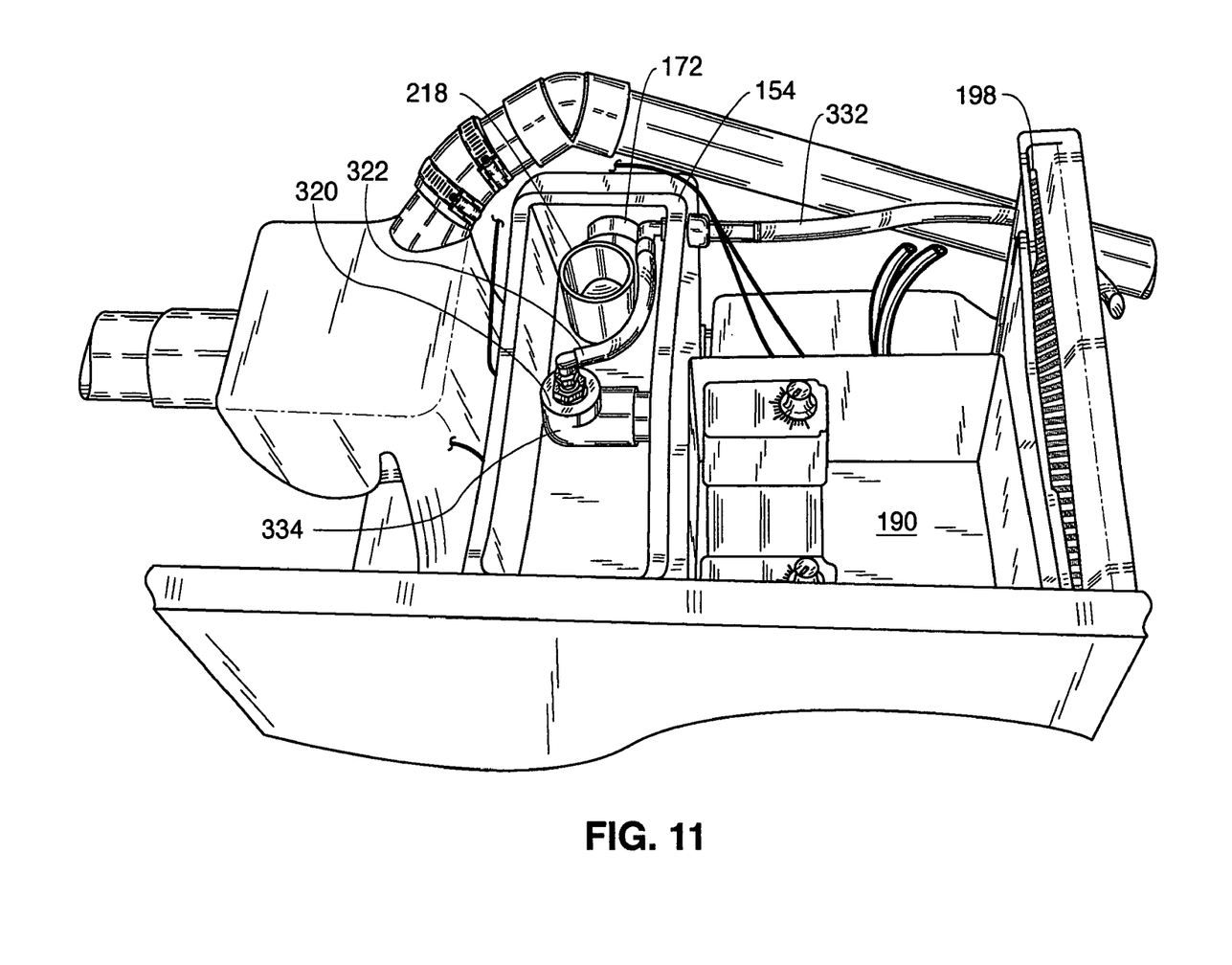
FIG. 11 is a top perspective view of the weir and oil pump of the embodiment of FIG. 10.

Referring now to FIGS. 10 and 11, a third embodiment can be seen. The housing 156 has multiple chambers of varying heights, including a preliminary chamber 158, a second chamber 160 and a grease extraction chamber 174. The multiple level chambers 158 and 160 promote a significant rise and fall of fluid level within the housing 154. This rise and fall of fluid level aids the oil and grease to rise to the top of the column of water. This rise and fall of fluid level event is promoted by large volume flows when the sink is emptied. Once the flow is in the chamber 154, the oil and grease rises to a stratum above the water under the influence of gravity.

After the solid waste material has been removed from the liquid flow by being trapped it the preliminary chamber, the liquid flow travels into the second chamber 160. The volume of water received in the housing 156 rises in the housing 154 when the sink 116 is emptied, causing the oil and grease to flow into the second chamber 160. Heaters 180 are located in the second chamber 160 and the grease extraction chamber 174 to maintain the oil and grease in a liquid form. These heaters 180 may be manually turned on or controlled with sensors which provide information to a control device which turns the heaters 180 on at preset times or as conditions warrant.

FIG. 10 shows a screen housing 199, like the slot of FIG. 8, to receive a screen 198 separating the preliminary chamber 158 from second chamber 160. An eductor solenoid 193 directs fresh water through liquid line 195 from a municipal supply (not shown) into solids discharge pipe 184 to educt solids collected in the chamber 158 to the sewer outlet 186. A solenoid valve 207 closes to prevent return flows on the liquid line when the eductor is not in operation. Solid waste transporter embodiments discussed previously can be used if suitable.

As seen in FIG. 11, a weir 218 is located in the grease extraction chamber 174 within the housing 154. The weir 218 is made of tubular plastic and has an outwardly flanged lip at the top and is adjustably mounted on the intake to the grease outlet 172. The height of the weir 218 is adjustable in the grease extraction chamber 174, and is preferably positioned so that it is above the static water level. Because the height of the weir 218 is set above the height of the highest water level, only grease and oil will flow into the weir 218 and out the oil and grease outlet 172 into a grease storage tank (not shown). The addition of the weir 218 provides the apparatus with the ability to have automatic passive removal of the oil and grease. The weir is set to extend slightly above the maximum water level in the grease extraction chamber 174 at the maximum flow rate of water, which is typically about 20 gallons per minute for a kitchen sink. Because the weir is adjustable, its height can be varied to accommodate other maximum water heights caused by other flow rates, or by imbalances in the mounting systems, or the like. As successive flows of fluid are released from the sink, the fluid column rises in the oil/grease extraction chamber 174. The oil/grease rises to the top of the fluid column, and as the oil/grease rises it will flow over the top of the weir 218 through the oil/grease outlet 172 into the storage tank (not shown). The fluid enters the grease extraction chamber 174 through the water/grease transfer tube 188. The water grease transfer tube 188 also prevents the water level in the grease extraction chamber 174 from exceeding height by permitting excess water to flow back into the preliminary chamber 158 at the conclusion of a sink dump cycle.

As seen in FIG. 10, a tubing 330 may be provided, connected at one end to the chamber 174 and at the other end through a solenoid 332. Solenoid 332 can draw water from the municipal supply and direct it through tubing 330 to the chamber 174 to raise the liquid level in the chamber 174 and cause oil/grease to overflow the weir 218. The municipal supply is also connected to the eductor.

FIG. 11 shows the tubing connected to an internal transfer tube 322 within the housing 174, directed downwardly in cowling 334 so as to form a jet and induce further flow into the housing 174 and to restrict the added water from simply draining out of the tube 188. Also, by injecting these downwardly, the oil/grease mat at the top of the chamber 174 is less disturbed, so less water (as distinguished from oil/grease) overflows the weir during such operation. The pump 332 can be selectively controlled in response to a sensor, a timer or manually. A suitable time for actuation is when there is a drop of effluent from the sink feeding the apparatus, with its attendant rise in liquid level within the apparatus, as a further aid against backflow out of the chamber 174. Preferably, the actuation is in response to conditions sensed by two sensors on the chamber 174. When a lower sensor changes from sensing water to sensing oil/grease, the oil/grease mat is thick and actuation of the pump 332 will discharge the oil/grease over the weir. When a higher sensor changes from sensing oil/grease to water, the mat has been transferred, so the pump is turned off. Alternatively, instead of the second sensor, the pump may be turned off after the elapse of a period of time.

Figure 12:
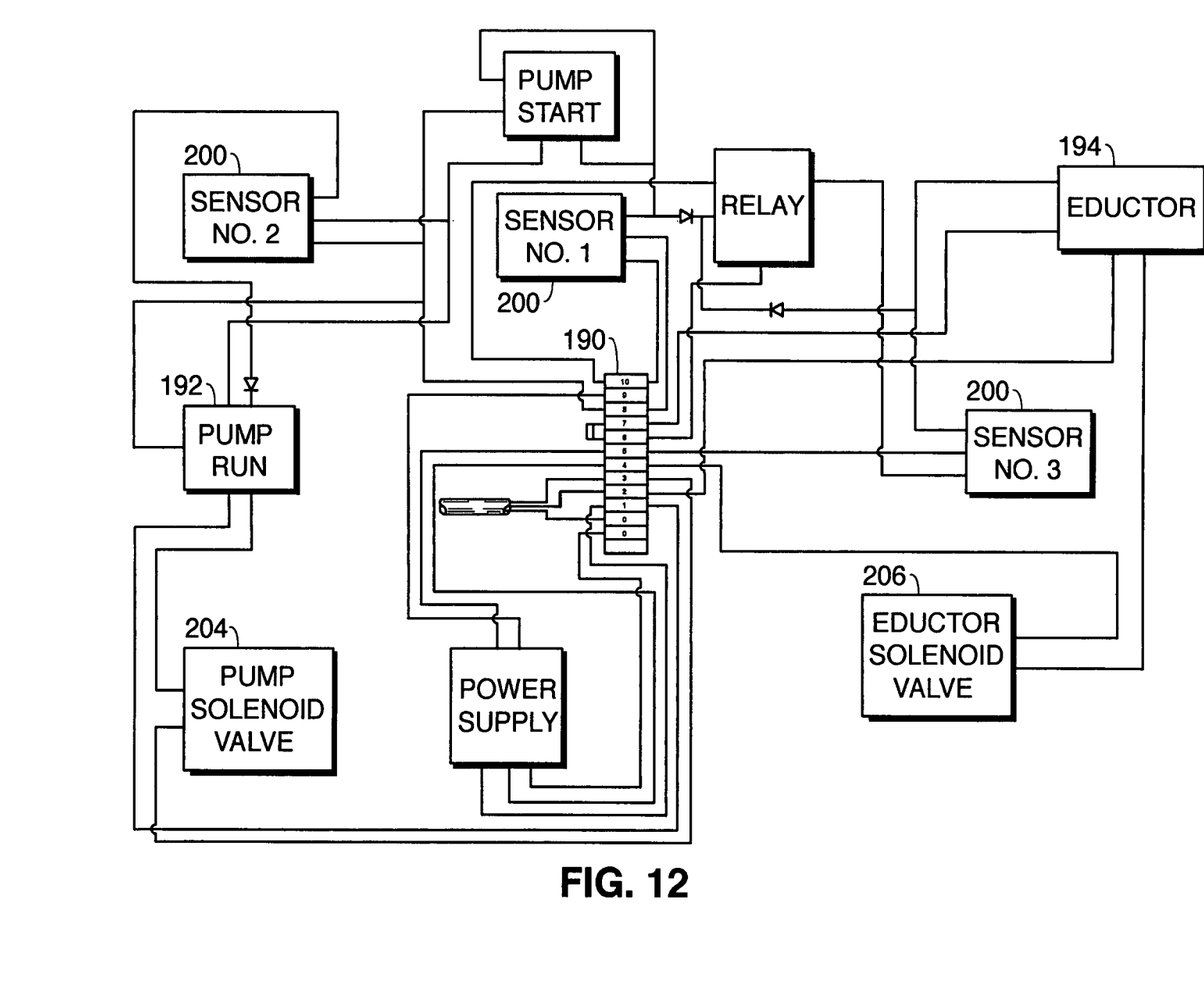
FIG. 12 is a schematic drawing showing the function of the central control module.

Referring now to FIGS. 10, 11 and 12, the oil and grease separator 154 may further include a central control module 190. The central control module 190 is comprised of a grease pump controller 192, an eductor controller 194, a solenoid 204 for the oil grease pump 220, a solenoid 206 for the eductor 166, and three sensors 200. The central control module 190 actuates functions based on the signals received from the sensors 200. One of these functions is to open valve 202 via solenoid 204 and engage the oil and grease pump 220 to pump oil/grease from the top of the fluid column in the grease extraction housing 174 into an oil/grease storage tank. The control module 190 opens the oil/grease pump solenoid valve 204, 207 through the oil pump controller 192 permitting actuation of the oil/grease pump 220. The control module 190 also closes the solenoid 204 for the grease pump 220 by signal to the oil pump controller 192 thereby ceasing grease pumping from the oil/grease extraction chamber 174.

The other function is to initiate solid waste removal by the eductor 166. When a sensor 200 senses the presence of fluid (instead of air) it initiates actuation of the eductor 166 by passing the appropriate signal to the central control module 190. Once the appropriate signal is received, the central control module 190 activates the eductor controller 194 which opens the solenoid 206 and its valve 168 for the eductor 166, permitting the eductor 166 to remove solid waste from the effluent flow in the preliminary chamber 158. When the sensor 200 again senses air, the central control module 190 directs a signal to the eductor controller 194, which closes the solenoid 206 and its valve 168 for the eductor 166 thereby stopping the eductor 166 from solid waste removal. Various other control schemes can be used.

Figure 13:
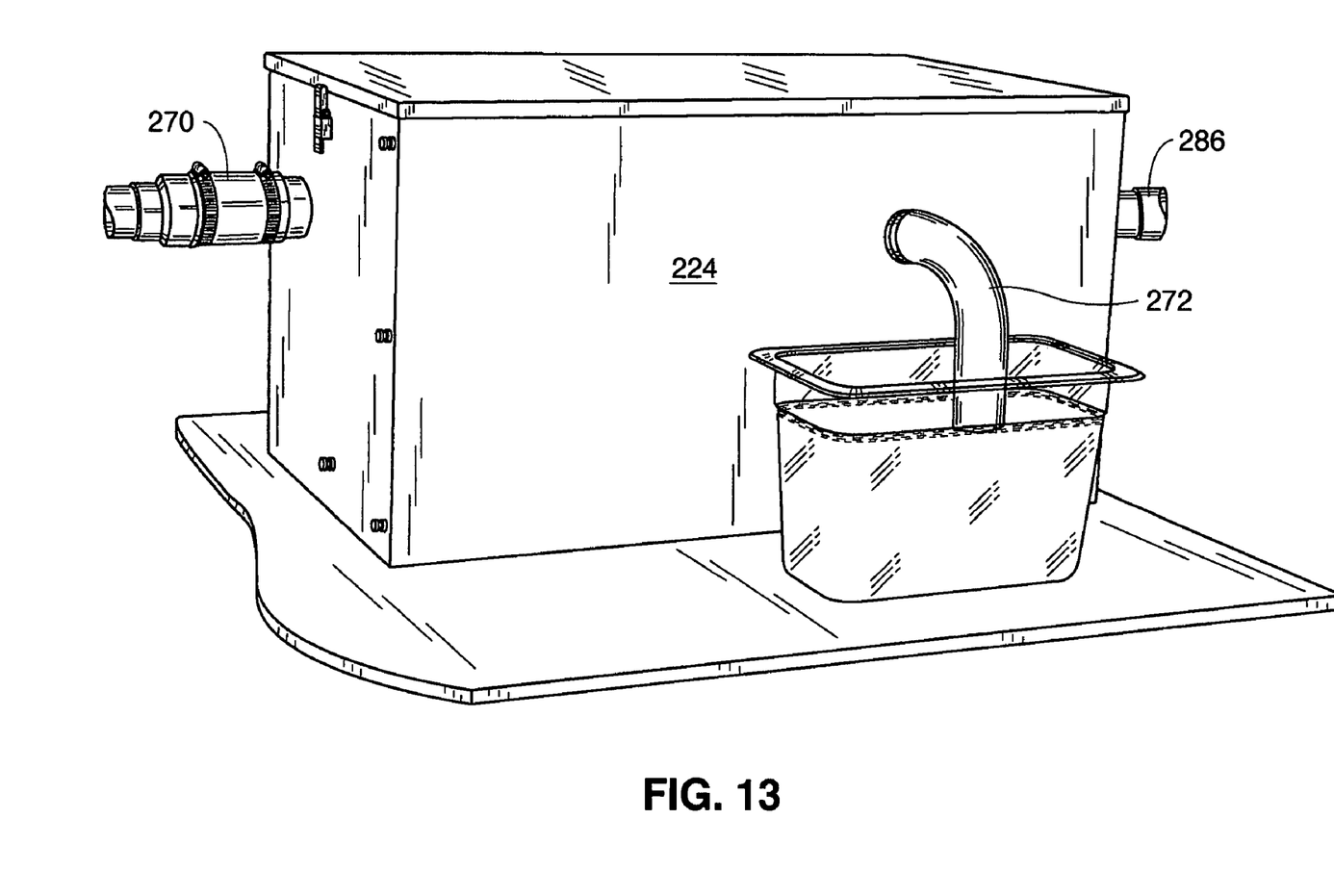
FIG. 13 is a front view of the protective cover of the alternate embodiment.

FIG. 13 shows another embodiment, in which the oil and grease separator 110 has a stainless steel protective case 224. The cover is rectangular and is constructed with an inlet pipe 270 from the sink (not shown) a sewage outlet pipe 286 and a grease outlet pipe 272. The case 224 is constructed of stainless steel sheets that are welded together to form the rectangular case for the unit. The case 224 may also be constructed from roto-molded plastic. The stainless steel sheets forming the case 224 in this embodiment may also be attached together with nuts and bolts or other fastening means. The protective case 224 provides protection from damage to the oil and grease separator 110.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A method of removal of grease and oil from effluent water comprising:
   installing an oil/grease separator assembly at facility site;
   connecting an inlet of the oil/grease separator to a kitchen sink with waste materials to be removed and separated;
   connecting an outlet of the oil/grease separator to a sewage system;
   operating the oil/grease separator to separate and remove oil/grease from the effluent water by receiving effluent flow and permitting oil/grease to float to the top of a water component of the effluent and flowing oil/grease floating on water over a discharge outlet to an external storage tank during periods of high flow from the source of discharging effluent to an oil/grease storage tank and permitting water to flow downstream on a separate path below the discharge outlet to a second outlet connected to a drain; and
   returning water to a housing along a path from a low portion of the oil/grease storage tank as the fluid level subsides.

2. A method of removal of grease and oil from effluent water comprising:
   permitting oil/grease of the effluent to float to the top of water of the effluent in a housing at times between large flows;
   receiving intermittent flows of effluent containing water and oil/grease from a kitchen sink into the housing so as to raise the liquid level in the housing;
   when the liquid level in the housing has raised to a threshold, flowing oil/grease floating on water over a discharge outlet to an external oil/grease storage tank and permitting water to flow downstream on a separate path below the discharge outlet to a second outlet connected to a drain;
   continuing to discharge effluent from the housing after the intermittent large flow so that the liquid level subsides; and
   as the fluid level subsides, returning water from a low portion of the oil/grease storage tank to the housing.

3. The method of removal of grease and oil from effluent water as claimed in claim 2, wherein the intermittent large flows are received downwardly into the housing.

4. The method of removal of grease and oil from effluent water as claimed in claim 2, wherein the second outlet defines a static fluid level in the housing and during periods of large flow, the fluid level rises so the oil/grease flows over the discharge outlet at a height that is higher than the static fluid level.

5. The method of removal of grease and oil from effluent water as claimed in claim 4, further comprising focusing the oil/grease within the housing so it is near the discharge outlet.

6. The method of removal of grease and oil from effluent water as claimed in claim 2, wherein the discharge outlet discharges oil/grease to an oil/grease storage tank that surrounds the housing.

7. A method of removal of grease and oil from effluent water comprising:
   receiving intermittent large flows of effluent containing water and oil/grease downwardly from a kitchen sink into a housing having a static liquid level and other, smaller flows between the intermittent large flows;
   permitting oil/grease of the effluent to float to the top of water of the effluent at times between large flows;
   raising the liquid level above the static liquid level so oil/grease floating on water flows over a discharge outlet at a height that is higher than the static liquid level to an oil/grease storage tank that surrounds the housing, accompanied by water, and permitting grey water to flow downstream on a separate path below the discharge outlet to a second outlet connected to a drain, and as the liquid level subsides, returning water from a low portion of the oil/grease storage tank to the housing,
   wherein during periods of flow smaller than a large flow, grey water flows downstream on the separate path to the second outlet without raising the liquid level to the height of the discharge outlet.

8. A method of removal of grease and oil from effluent water comprising:
   receiving intermittent large flows of effluent containing water and oil/grease and solids from a kitchen sink into a housing;
   holding the solids of the effluent in an upstream portion of the housing;
   permitting oil/grease of the effluent to float to the top of water of the effluent at times between large flows;
   flowing oil/grease floating on water over a discharge outlet during periods of large flow from the source of discharging effluent to an external oil/grease storage tank and permitting water to flow downstream on a separate path below the discharge outlet to a second outlet connected to a drain;
   periodically transferring the solids from the upstream portion to the drain with a solid waste transporter; and returning water from a low portion of the oil/grease storage tank to the housing as the fluid level subsides.

9. A method as claimed in claim 8 wherein the transferring of solids is by eduction.

10. A method as claimed in claim 9 wherein eduction is by a jet of water from a water supply.

11. A method as claimed in claim 10 wherein the water supply is derived from the effluent being separated.

12. A method as claimed in claim 8 wherein the transferring of solids is by a macerating pump.

* * * * *